United States Patent [19]

Sylvester

[11] 4,236,798
[45] Dec. 2, 1980

[54] FILM PACK

[75] Inventor: Robert A. Sylvester, Hilton, N.Y.

[73] Assignee: Eastman Kodak Company, Rochester, N.Y.

[21] Appl. No.: 84,474

[22] Filed: Oct. 15, 1979

[51] Int. Cl.³ .................. G03B 17/50; G03B 19/10; G03B 17/26

[52] U.S. Cl. .................................. 354/181; 354/86; 354/276

[58] Field of Search .............. 354/275, 276, 277, 83, 354/86, 173, 187, 174, 186, 178–182, 304

[56] References Cited

U.S. PATENT DOCUMENTS

| | | | |
|---|---|---|---|
| 363,833 | 5/1887 | Loeber | 354/186 |
| 416,650 | 12/1889 | Stirn | 354/180 |
| 424,857 | 4/1890 | Chouteau | 354/277 X |
| 439,012 | 10/1890 | Kipper et al. | 354/180 |
| 458,981 | 9/1891 | Perry | 354/174 |
| 2,483,578 | 10/1949 | Gallistel | 354/180 |
| 2,497,157 | 2/1950 | De Witt | 354/180 |
| 2,873,658 | 2/1959 | Land | 354/83 X |
| 3,541,937 | 11/1970 | Nerwin | 354/86 X |
| 3,699,862 | 10/1972 | Kindig | 354/83 |
| 3,930,264 | 12/1975 | Asano | 354/174 |
| 4,132,471 | 1/1979 | Svatek et al. | 354/86 |

*Primary Examiner*—Donald A. Griffin
*Attorney, Agent, or Firm*—J. A. Matthews

[57] ABSTRACT

A film pack, which includes a stack of instant-processing film units received in a housing, has a slide plate that is permanently coupled to the housing for reciprocal movement between a first position residing in the stack and a second position removed from the stack. Initially the slide plate serves as a dark slide to shield the film units from fogging through an exposure aperture in the housing. When reciprocated, however, such as in a processing camera, the slide plate is guided to enter the stack behind the forwardmost film unit, and to remove that unit from the housing through an exit slot. The slide plate can also support the forwardmost film unit in the exposure position, shield other than the forwardmost unit from exposure when the film units are transparent, and assist in controlling processing of the film units.

9 Claims, 18 Drawing Figures

_Fig-7_

_Fig-8_

_Fig-9_

_Fig-10_

FILM PACK

BACKGROUND OF THE INVENTION

The present invention relates to film packs of the type including a plurality of film units stacked in a cartridge housing. More specifically the invention relates to such a pack, particularly of self-processing film units, having a slide plate that can be employed for a number of functions including: shielding the film units from light, supporting the film units for exposure and during processing, and transporting the film units from the pack through a camera processing mechanism.

It is well known to supply photographic film in a pack that includes a plurality of individual film units stacked in a cartridge housing. Typically, the housing has an exposure aperture covered by a dark slide which shields the units from premature exposure, called fogging. In operation, the pack is positioned in a camera, the dark slide is removed, and the film units are manipulated for sequential presentation to the exposure aperture. In accordance with the disclosure of U.S. Pat. No. 458,981, for example, a stack of transparent film units is supported by a pressure plate and spring assembly. A removable dark slide shields the units from fogging, and opaque film holders, interleaved behind each film unit, protect subsequent units in the stack from simultaneous exposure with the first unit. An exposed film unit and its holder are removed from the forwardmost position by a gear wheel, while the pressure plate and spring assembly resiliently advance the next successive unit and holder into the exposure position. Another approach is depicted in U.S. Pat. No. 424,857. In this example the film units are carried in a cartridge, and a slide, initially serving to cover the cartridge exposure aperture, is used to push the sequentially exposed film units from the forwardmost position.

The above-noted patents represent technology which was developed for use with film plates that today serve only in somewhat specialized applications. Film packs have received new attention, however, with the increase in popularity of self-processing film. In present commercial approaches, self-processing film units are not only manipulated within the pack, but are transported from the pack and camera through a mechanism that initiates processing of the film units. Typically, a pair of opposed pressure rollers rupture a chemical pouch on the film unit and distribute a processing composition from the pouch across the picture area. In U.S. Pat. Nos. 4,132,471 and 3,699,862, for example, the film units are supplied in a cartridge housing having an exposure aperture, covered by a dark slide, and an exit slot. A reciprocating camera mechanism expels the dark slide and then the film units one at a time through the exit slot, while a pressure plate and spring assembly advance the next successive film unit into the exposure position. Other approaches for transporting film in instant cameras include manual cranks, see U.S. Pat. No. 4,122,469; lanyards, see U.S. Pat. No. 3,965,480; and levers, see German Pat. No. 2,619,919.

It should be apparent from the above background that numerous approaches have been proposed for manipulating film units in a pack. Some employ a dark slide for removing the film units from the exposure position, and some advance the film units through camera processing mechanisms. It will become apparent from the following description, however, that none of these prior approaches offer the important advantages of the present invention.

SUMMARY OF THE INVENTION

In accordance with the present invention, a film pack including a plurality of film units stacked in a cartridge housing, is provided with a slide plate that is adapted to reciprocate relative to the housing between a first position residing in the film unit stack, and a second position removed from the stack. The slide plate is guided on successive reciprocations to enter behind the forwardmost film unit in the stack and to remove that film unit from the housing through an exit slot.

In accordance with a preferred embodiment of the invention, the pack includes self-processing film units, and the slide plate initially serves as a dark slide, residing in the stack between the film units and an exposure aperture. A first reciprocation locates the slide in position behind the forwardmost film unit, while subsequent reciprocations remove the respective film units through a camera processing mechanism.

In other embodiments, the slide plate supports the forwardmost film unit in the exposure position, shields other than the forwardmost film unit from exposure when the film units are transparent, or assists in controlling the processing of the film units.

The invention and its advantages will become more apparent from the detailed description which follows.

BRIEF DESCRIPTION OF THE DRAWINGS

In the detailed description of the preferred and alternative embodiments presented below, reference is made to the accompanying drawings, in which.

DETAILED DESCRIPTION OF THE PREFERRED EMBODIMENT

Figure 1:
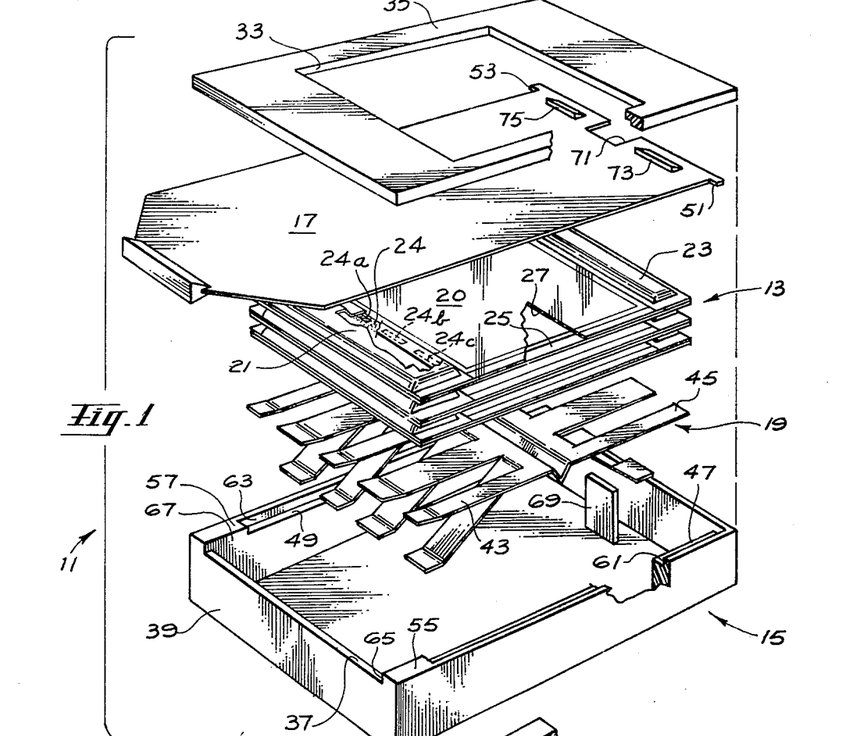
FIG. 1 is an exploded view of a film pack according to a preferred embodiment of the present invention, including a stack of instant-processing film units received in a cartridge housing between a slide plate and a spring assembly.
Figure 2:
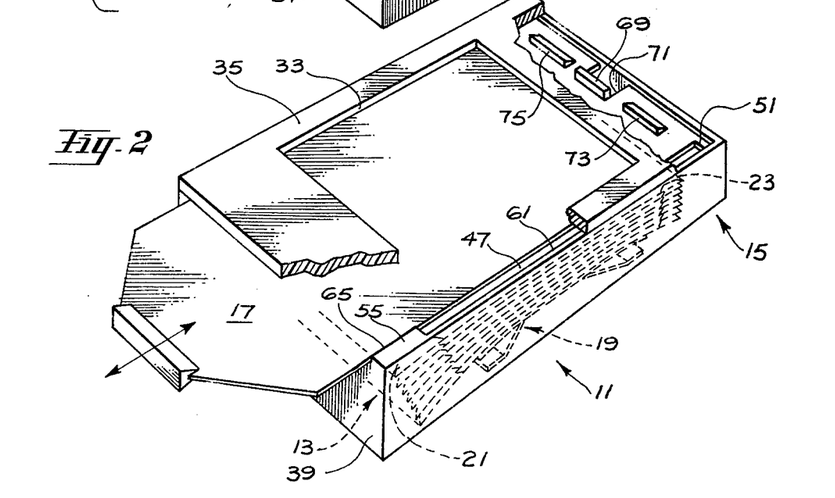
FIG. 2 is a perspective view of the film pack depicted in FIG. 1, with a portion of the cartridge housing cut away to reveal the slide plate and cooperating structure for slidably coupling the plate to the housing.

A preferred embodiment of the invention is depicted in FIGS. 1-9. Referring first to FIGS. 1 and 2, the film pack 11 includes a stack of film units 13 received in a cartridge housing 15 between a slide plate 17 and a spring assembly 19. As will become more apparent from the following description, the film units are sequentially exposed in and removed from the forwardmost position in the housing, while the spring assembly advances the next successive film unit into the position vacated by the removed unit.

The film units are a conventional self-processing type, which include an image-recording area 20, a rupturable pouch 21, and a fluid trap 23. Such units are adapted for use in processing cameras that distribute a liquid processing composition from the pouch across the image-recording area. The pouch is compressed by a camera mechanism which ruptures a burst seal 24, releasing the liquid composition under the control of permanent seals 24a, 24b and 24c. Any excess of the composition, after it is distributed is collected and neutralized in the trap.

The image area typically comprises a photosensitive sheet 25 which carries a plurality of layers including photosensitive, dye image-providing and dyeable materials. Exposure of the film unit to a scene establishes a latent image in the photosensitive layers. That image is then developed by the processing composition to effect migration of an imagewise distribution of the dyes to the dyeable layers.

A cover sheet 27 also may be employed, to confine the processing composition to the intended area. In one commercially available unit, for example, the cover sheet is transparent and is permanently attached to the photosensitive sheet along its edges. The photosensitive layers are adapted to be exposed through the cover sheet, and the dyeable, image-receiving layer is viewable from the face of the film unit which is opposite the cover sheet.

The cartridge housing comprises a light-tight, generally rectangular casing including an exposure aperture 33 in its forward wall 35 and an exit slot 37 in one end wall 39. The aperture approximates the size of the image-recording area of the film unit to permit exposure of the unit through the forward cartridge wall, while the exit slot provides for the removal of the individual film units from the cartridge after such exposure. The spring assembly assists in this process by resiliently urging the film units toward the forward wall. Thus, as each film unit is exposed through the aperture and removed through the exit slot, the next successive film unit is advanced into the exposure position. Although the forwardmost film unit is essentially flat, the other units may have substantial longitudinal curvature, due to the greater thickness of the chemical pouches and traps, compared to the image area. Flexible areas 43 and 45 of the platen are designed to accommodate this splaying apart of the ends of the film units.

Referring now more specifically to the details of the preferred embodiment, the slide plate is coupled to the cartridge housing for reciprocation between a first position residing in the film unit stack and a second position removed from the stack in the direction of the exit slot. Initially, in its first position, and as depicted most clearly in FIGS. 1, 2 and 4, the slide plate is located between the film units and the exposure aperture. There it serves as a dark slide for shielding the film units from premature exposure. When reciprocated a first time, however, to the second position (FIG. 5) and back to the first position (FIG. 7), the slide plate uncovers the aperture and enters the stack behind the forwardmost film unit. Then, similar subsequent reciprocations sequentially remove the film unit that is then forwardmost in the stack, and reinsert the slide plate behind the next successive film unit. As each film unit is exposed, it is thus removed from the housing through the exit slot and the next film unit is advanced into the exposure position.

Referring again to FIGS. 1 and 2, the slide plate is mounted in the housing for longitudinal sliding movement between its first and second positions. Opposed grooves 47 and 49, located in the cartridge side walls, receive the lateral edges of the slide plate and guide its movement. Opposed tabs 51 and 53 project outwardly from the plate adjacent its trailing end and permanently couple the plate to the housing. The tabs are captured in the same grooves, 47 and 49, but extend beyond abutments 55 and 57, at the ends of the exit slot, to catch the end of the slide plate before it can move through the slot. The lateral position of the slide is determined by the verticle surfaces 61 and 63 of the grooves, which engage the tabs 51 and 53, and by the vertical surfaces 65 and 67 of the abutments, which engage the lateral edges of the slide.

At its trailing end the slide plate is adapted to extend beyond the ends of the film units. The film units are restrained by a finger 69, that extends forwardly from the back wall of the housing, while the slide plate includes a cut-out 71 to accommodate movement of the trailing end of the slide plate beyond the film restraining finger. Also adjacent the trailing end of the slide plate are film picking elements 73 and 75, positioned as will become more apparent from the following description, to engage the end of the forwardmost film unit when the slide plate is in its first position.

Figures 3, 6:
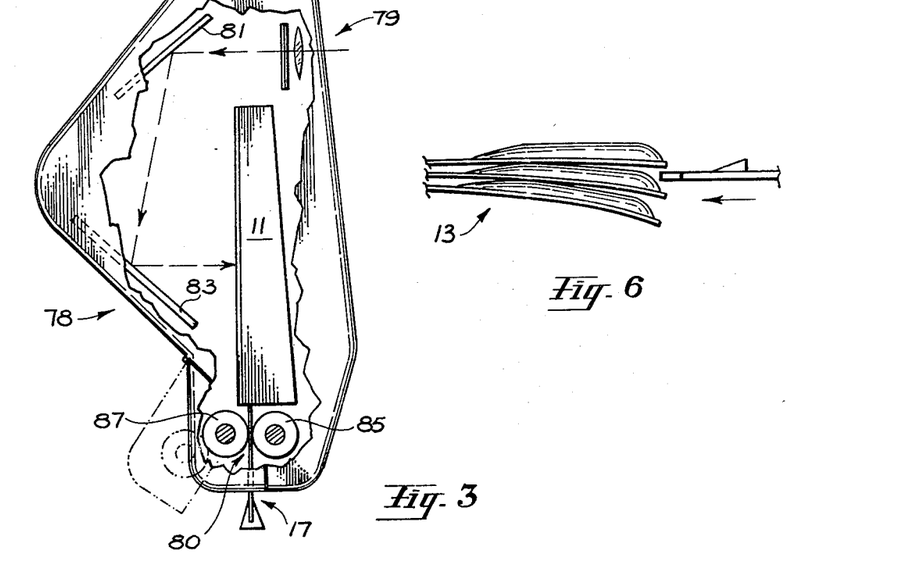
FIG. 3 is a side view of a processing camera partially cut away to depict the film pack of FIG. 1 in operative relationship with the camera processing mechanism.
FIGS. 4–9 are sectional schematic views of the film pack of FIGS. 1 and 2, depicting the operation of the slide plate to sequentially remove respective film units from the cartridge housing.
Figure 4:
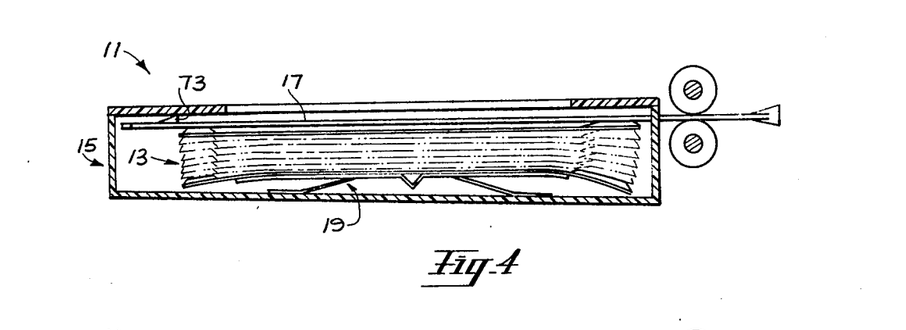
Figure 5:
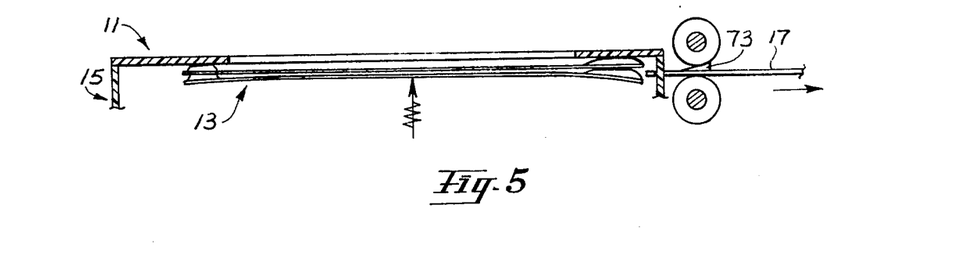

The operation of the film pack and dark slide is depicted most clearly in FIGS. 3-9. In FIG. 3 the pack is depicted in a processing camera 78 having exposure and processing mechanisms 79 and 80 respectively. The exposure mechanism includes two mirrors 81 and 83 to fold the optical path for a more compact camera. The processing mechanism has first and second pressure members in the form of rollers 85 and 87, which are mounted to separate for loading the pack into the camera. Once loaded, the leading end 88 of the slide plate extends from the cartridge housing and between the rollers to a position accessible from the exterior of the camera.

Figure 7:
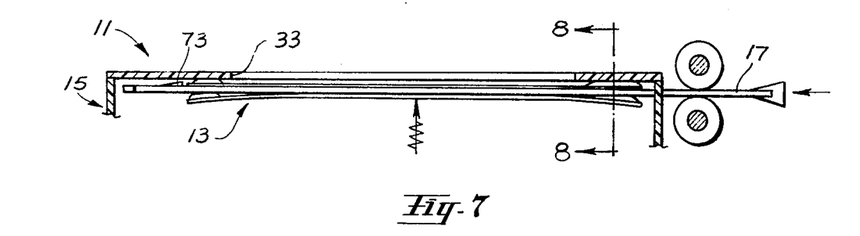

The pack is prepared for exposing the first film unit by reciprocating the slide plate from the first position (FIG. 4) to the second position (FIGS. 5 and 6) and back to the first position (FIG. 7). During such movement, the slide plate is completely removed from the stack, the forwardmost film unit is advanced into the exposure position in engagement with the forward wall of the housing, and the slide plate is inserted into the stack behind the forwardmost film unit. As depicted in FIG. 6, this operation is facilitated by the previously-mentioned splaying apart of the film units at their leading ends, and the increased thickness of the chemical pouches, which separate the film units.

The slide plate is mounted to reciprocate in a plane that is spaced sufficiently from the forward wall of the cartridge housing to accommodate one, and only one, of the film units. Thus, when the plate is returned to its first position it will enter the film unit stack between the first two film units.

Figure 8:
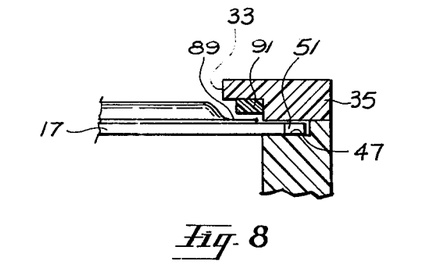

Referring now to FIGS. 7 and 8, the slide plate supports the forwardmost film unit in the exposure position behind the aperture by capturing the lateral edges of the film unit 89 between cartridge rails 91 and the slide plate. At the same time, the slide plate isolates the forwardmost film unit from the remainder of the stack and from the spring assembly.

Figure 9:
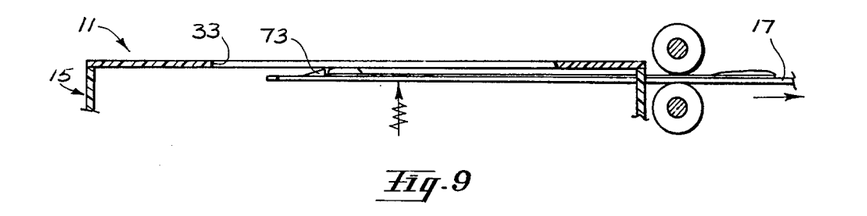

The removal of the forwardmost film unit is depicted in FIG. 9. When the slide plate is moved from its first position to its second position, the film picking elements 73 and 75 catch the trailing end of the film unit and pull it with the slide through the exit slot and the camera processing mechanism. In addition to this transporting function, however, it should be noted that the slide plate facilitates proper gating of the film units through the exit slot. The height of the exit slot can be made significantly greater than the thickness of a film unit, so the slot will not unduly restrict the removal of the film unit, while the location of the slide plate appropriately can be chosen to engage the rearward edge of the slot to prevent subsequent film units in the stack from being withdrawn with the forwardmost unit.

It should also be noted that the slide plate can be used to facilitate or modify the processing of the film units. For example, the face of the slide plate which is away from the forwardmost film unit may include lubricants to reduce friction, or the face which engages the forwardmost unit may be configured to control the separation of the pressure rollers, and thereby the distribution of the processing composition. Suitable wedges on the slide plate adjacent the trailing end of the forwardmost film unit could even be substituted for spacers that are usually incorporated into the film unit itself. Although none of these features are part of the preferred embodiment, it should be apparent that numerous such advantages are obtainable.

As the slide plate moves to its second position, the film engaging members 73 and 75 move through the camera pressure members before tabs 51 and 53 catch against abutments 55 and 57. The transported film unit is then retrieved by simply removing it from the slide plate, and the slide plate is returned to its first position, whereupon it is again guided behind the forwardmost film unit. This process is repeated as each film unit is exposed, until the pack is exhausted.

FIRST ALTERNATIVE EMBODIMENT

Figure 10:
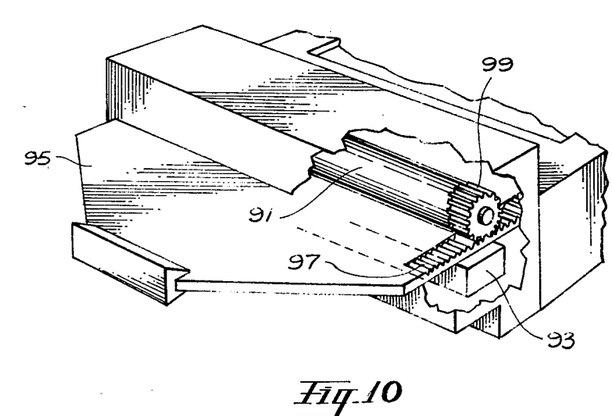
FIG. 10 is a partial perspective view of an alternative embodiment of the film pack adapted for automated operation.

An alternative embodiment of the present invention, adapted for motorized operation, is depicted in FIG. 10. In this embodiment, pressure members 91 and 93 are provided in the film pack instead of the camera. The slide plate 95 includes a rack 97, along one or both of its lateral edges, and one of the pressure members, for example 91, includes one or more pinion gears 99 rotatably mounted to engage the rack on the slide plate. Alternate rotations of the pinion gear, first in one direction and then the other, will automatically reciprocate the slide plate between its first and second positions. Although the corresponding camera structure is not depicted, it should be understood that a suitable reversible motor and drive mechanism can be used to rotate the pinion gear.

SECOND ALTERNATIVE EMBODIMENT

A second alternative embodiment of the invention is depicted in FIGS. 11–14. Like the preferred embodiment, the film pack 111 includes a stack of film units 113 received in a cartridge housing 115 between a slide plate 117 and a spring assembly 119. Compared to the preferred embodiment, the housing is larger and is adapted to receive a greater number of film units.

Figures 11, 12:
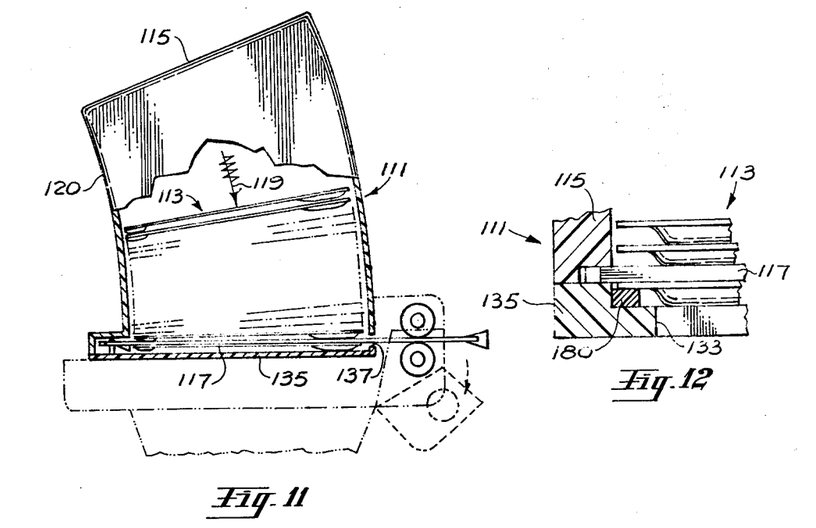
FIG. 11 is a side view of another alternative embodiment of a film pack in accordance with the present invention, adapted for use with large stacks of film units.
FIG. 12 is a partial sectional view of the pack of FIG. 11 depicting the slide plate in a first position supporting the forwardmost film unit for exposure.

The forward portion of cartridge housing, which is adapted to mate with a suitable processing camera, can be constructed from essentially the same cartridge housing parts that were used in the preferred embodiment. The back wall is removed, however, to provide for an extended arcuate section 120 that accommodates the additional film units. The shape of this section preferably conforms to the approximate shape of an unconfined stack of the film units with the chemical pouches all arranged at one end.

It has been found in a film pack of this size that typical spring assemblies may not provide sufficient force to hold the forwardmost film unit in a proper exposure position. In accordance with this embodiment the slide plate 117 can be called upon to serve this purpose as well as for transporting the individual film units from the pack. The spring assembly 119 is then required only to provide sufficient force to advance the stack of film units toward the exposure aperture 133 (FIG. 12) in the forward cartridge wall 135 as each successive film unit is removed from the stack through exit slot 137.

In operation, the pack is loaded into a processing camera or camera back 179 (FIG. 14) and the slide plate is reciprocated once, from its first position to the second position and back to the first position. This removes the slide from its initial location in front of the stack, where it serves as a dark slide, and inserts the slide behind the forwardmost film unit. In this position, depicted in FIGS. 11 and 12, the slide plate supports the forwardmost unit against the forward cartridge wall, which establishes the film plane. At the same time, the slide plate isolates the forwardmost unit from forces that otherwise might be transmitted through the other film units in the stack.

Referring most specifically to FIG. 12, and remembering the configuration of the film units from FIG. 1, it will be seen that the forwardmost film unit is accurately located by capturing its lateral edges, which are essentially flat, between the slide plate 117 and cartridge housing side rails 180.

As in the preferred embodiment, subsequent reciprocations of the slide plate will transport the successive film units, as they are exposed, through the cartridge exit slot and the camera processing mechanism. The elements 173 and 175 catch the trailing end of the forwardmost film unit and transport it with movement of the slide plate to the second position, then upon its return to the first position, the slide plate is guided between the first two film units.

Figures 13, 14:
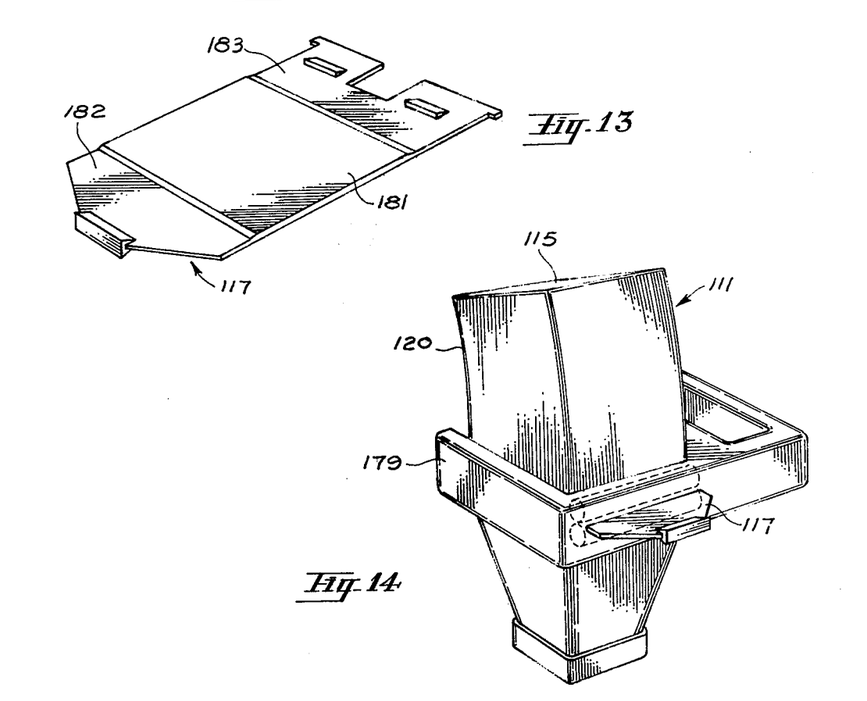
FIG. 13 is a perspective view of the slide plate of the film pack of FIG. 11.
FIG. 14 is a schematic perspective view of the pack of FIG. 11 in a processing camera back and camera.

In connection with this film locating feature, it may be desirable to shape the slide plate, as depicted in FIG. 13, with a central section 181 that is slightly thicker between the end portions 182 and 183 that support the pouch and trap of the film unit. The end portions permit some bending of the pouch and trap away from the forward housing wall to enhance engagement between the image-recording portion of the film unit and film locating structure in the forward wall. Of course other suitable shapes undoubtedly will now be apparent to those skilled in the art who are faced with the problems of locating film units for exposure.

THIRD ALTERNATIVE EMBODIMENT

A third alternative embodiment of the invention is depicted in FIGS. 15-18. The film pack 311 includes a stack of film units 313 received in a housing 315 between a slide plate 317 and a spring assembly 319.

In this embodiment, the film units are self-processing transparencies which include a transparent image-recording area 320 (FIG. 17), a rupturable chemical pouch 321 and a trap 323, all mounted in a somewhat stiff plastic or cardboard frame 324.

Figure 15:
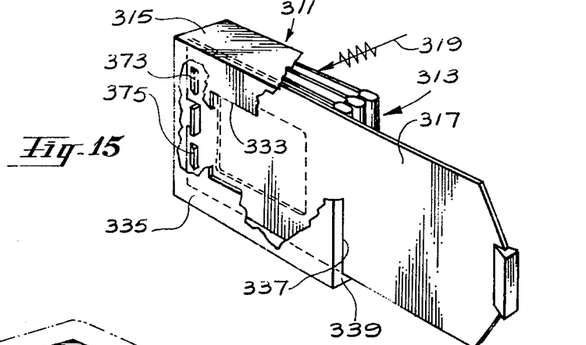
FIG. 15 is a perspective view of still another alternative embodiment of a film pack according to the present invention, which embodiment is adapted for use with transparent film.

The cartridge housing comprises a light-tight, generally rectangular casing including an exposure aperture 333 in its forward wall 335 and an exit slot 337 in end wall 339. As described in connection with the preferred embodiment, each film unit is exposed through the aperture and removed by the slide plate 317 through the exit slot. The next successive film unit is then advanced into the exposure position and the process is repeated until the pack is exhausted of film units.

The film units of this embodiment do not include any opaque layers, and cannot be processed in daylight. Accordingly light from an image formed in the forwardmost film unit in the stack will simultaneous expose the subsequent film units, unless precautionary measures are taken, such as in accordance with the present invention.

Figure 18:
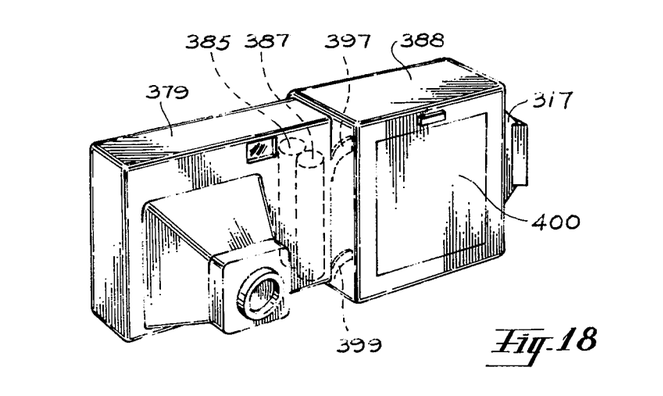
FIG. 18 is a perspective view of the film pack of FIG. 15 in a processing camera adapted for use therewith.

Referring now to the operation of this embodiment, the pack is loaded into a processing camera 379 including first and second pressure members 385 and 387 and a dark chamber 388. The leading end of the slide plate 317 is long enough in this embodiment to extend through the pressure members and the dark chamber to a position accessible from the exterior of the camera.

Figures 16, 17:
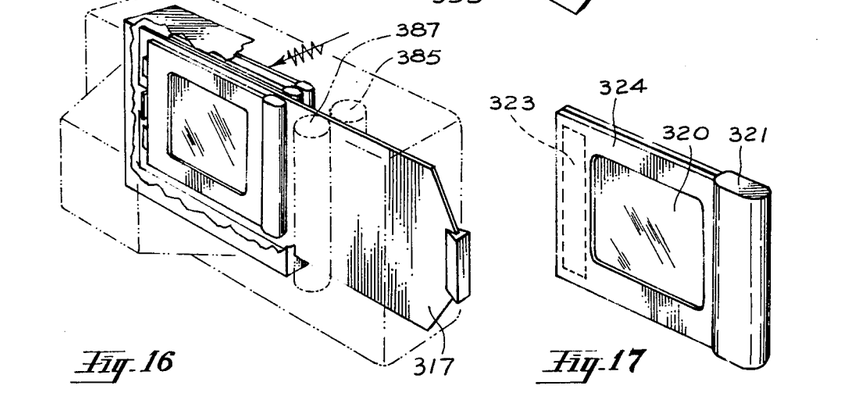
FIG. 16 is a perspective view of the film pack of FIG. 15 with the slide plate in position behind the forwardmost film unit.
FIG. 17 is a perspective view of one of the film units of the film pack of FIG. 15.

Like the preferred embodiment, the slide plate serves initially as a dark slide (FIG. 15) and the pack is prepared for exposing the first film unit by reciprocating the slide plate from the initial location into position in the stack behind the forwardmost film unit (FIG. 16). In this position, the dark slide shields the subsequent film units from simultaneous exposure with the forwardmost unit.

Subsequent reciprocations of the dark slide will transport the film units sequentially from the cartridge housing, through the processing mechanism, and into the dark chamber. When the slide plate is moved to its second position picking elements 373 and 375 catch the trailing end of the forwardmost film unit and transport it with movement of the slide plate. Then, when the plate is returned to its first position, it is guided between the first two film units then in the stack. In this embodiment it is desirable to automatically strip the exposed film units from the slide plate, and to stack the units in the dark chamber for processing. As depicted in FIG. 18, camera stripping fingers 397 and 399 are resiliently urged toward the slide plate, first to ride over the lateral edges of the film unit, as it moves into the dark chamber, and then to catch under and remove the film unit when the slide plate is returned. An access door 400 is provided for access to the film units after processing.

It should now be apparent from the foregoing description that unique structural features of the present invention possess significant advantages not available from the teachings of the prior art. The slide plate is a movable member that provides a simple and inexpensive mechanism for sequentially transporting a plurality of film units from a cartridge housing. In addition to providing the propulsive force to move the film units, the slide can be used to assist in gating the movement of the respective film units through the exit slot so that only one film unit at a time will move through the slot even though the height of the slot may be significantly greater than the thickness of one film unit.

When used in a processing camera, the slide plate can facilitate movement of the film units through the processing mechanism, such as by presenting a surface of optimum shape and frictional characteristics to at least one of the pressure members. Although not depicted in the present description, those skilled in the art will recognize that the slide plate could be shaped or provided with side rails, trap spacers, or other features to enhance the fluid spreading characteristics of the mechanism, eliminating the need for such elements that in present commercial products are provided in the film units.

The slide plate can serve as a dark slide to prevent fogging of the film units prior to use, and, when used with transparencies, it can shield subsequent film units from simultaneous exposure with the forwardmost film unit. Similarly, the slide can provide additional light protection to one side of the film unit during processing.

Still further, the slide plate assists in supporting the forwardmost film unit in the desired exposure position relative to the cartridge housing, while isolating such unit from distorting forces contributed by the pressure plate or other film units in the pack.

Although the invention has been described with particular reference to a preferred embodiment thereof, it will be readily understood that variations and modifications can be effected within the spirit and scope of the invention as described hereinabove and as defined in the appended claims.

We claim:

1. In a film pack for supplying photographic film units to film using apparatus; said pack including a stack of the film units in a cartridge housing having an exposure aperture through which the top film unit is exposable, an exit slot through which the exposed film unit is removable from the stack to present for exposure the next film unit on the stack; and a slide plate movable between a position covering at least some of the film units, and a position in which the slide plate extends from the housing and uncovers the film units; the improvement comprising:
   means for guiding said slide plate for movement from its extended position where it uncovers the film units to a position in the stack between the top film unit and the next film unit, and
   means on said slide plate for engaging the top film unit and removing that unit from the stack through the exit slot upon movement of said plate from its position in the stack to its extended position.

2. A film pack improvement as set forth in claim 1 wherein an end portion of said slide plate extends through the exit slot when said slide plate is in its position within the stack to enable said slide plate to be moved between said positions.

3. A film pack improvement as set forth in claim 1, wherein said slide plate serves as a dark slide for initially shielding the film units from exposure through the aperture, said guide means permitting initial movement of said slide plate to said extended position to uncover the film units without removing a film unit from said stack.

4. A film pack improvement as set forth in claim 1, wherein said slide plate shields the next film unit from simultaneous exposure with the top film unit when said slide plate is in its position in the stack between the top film unit and the next film unit.

5. In a cartridge for exposing and then dispensing one at a time, photographic film units stacked therein, said cartridge having a housing provided with an exposure aperture for exposing the top film unit and a dark slide covering the film units to prevent exposure thereof, said dark slide being movable from its stack covering position to present the top film unit for exposure; the improvement comprising:
   means mounting said dark slide for subsequent reciprocal movement into the stack between the top film unit and the adjacent film unit and then from the stack after exposure of the top film unit, and
   means on said dark slide for engaging and removing the top film unit from the housing during movement of the dark slide from the stack after exposure of the top film unit,
   said dark slide being actuatable through a series of such reciprocal movements to sequentially dispense said film units from said housing after their respective exposures.

6. In a cartridge for dispensing, one at a time photographic film units stacked therein, said cartridge having a housing provided with an exposure aperture for exposing the top film unit and a removable dark slide covering the film units to prevent exposure of the film units, the improvement comprising:
   means for supporting the dark slide for sequential movement (1) from the housing to uncover the film units, (2) back into the housing to a position between the topmost film unit and the next succeeding film unit, and (3) from the housing to engage and remove the topmost film unit from the housing.

7. In a film magazine including a housing for receiving a stack of photographic film units and a movable member movable between a first position in the stack and a second position in which the movable member is removed from the stack; the improvement comprising:
   means for guiding said movable member from its second position to a position in the stack between the top film unit and the next film unit, and
   means on said movable member for engaging the top film unit and moving that unit from the stack upon movement of said movable member from its position in the stack toward its second position.

8. A film magazine improvement as set forth in claim 7, wherein said movable member serves as a dark slide for initially shielding the film units from exposure, said guide means permitting initial movement of said movable member from its first position to its second position to uncover the film units without removing a film unit from said stack.

9. A film magazine improvement as set forth in claim 7, wherein said movable member serves as a dark slide and shields the next film unit from simultaneous exposure with the top film unit when said movable member is in its position in the stack between the top film unit and the next film unit.

* * * * *